United States Patent [19]

Mattei

[11] 4,438,521
[45] Mar. 20, 1984

[54] AUTOMATICALLY ADAPTIVE TRANSVERSAL FILTER

[75] Inventor: Anthony Mattei, Philadelphia, Pa.

[73] Assignee: RCA Corporation, New York, N.Y.

[21] Appl. No.: 385,920

[22] Filed: Jun. 7, 1982

[51] Int. Cl.³ .............................................. H04B 3/18
[52] U.S. Cl. ........................................ 375/16; 333/18
[58] Field of Search ........................... 333/18; 328/155; 375/12, 14, 16; 364/724, 825; 178/69 R, 69 M

[56] References Cited

U.S. PATENT DOCUMENTS

| | | | |
|---|---|---|---|
| 3,579,109 | 5/1971 | Hatley | 375/14 |
| 3,633,105 | 4/1972 | Lender | 375/14 |
| 3,708,766 | 1/1973 | Sha et al. | 333/18 |
| 3,978,407 | 8/1976 | Forney, Jr. et al. | 375/13 |
| 3,984,789 | 10/1976 | Luvinson et al. | 333/18 |
| 3,992,616 | 11/1976 | Acker | 364/724 |
| 4,089,061 | 5/1976 | Milewski | 364/724 |
| 4,145,747 | 3/1979 | Sakaki et al. | 364/724 |
| 4,196,405 | 4/1980 | Dily | 333/18 |
| 4,225,832 | 9/1980 | Faye | 333/18 |
| 4,227,160 | 10/1980 | Tamori et al. | 333/18 |
| 4,233,683 | 11/1980 | McRae | 375/14 |

Primary Examiner—Benedict V. Safourek
Attorney, Agent, or Firm—J. S. Tripoli; D. W. Phillion

[57] ABSTRACT

A method and apparatus for the adaptive equalizing of phase and amplitude distortion in a received signal by an N-stage digital delay line system and comprising the steps of digitally sampling the received signal and advancing each digital sample through successive stages of the N-stage digital delay line, producing a continuously up-dated scaled error signal after each advance of the digital samples in the delay line, multiplying the digital sample in each delay line stage by the scaled error signal after each sampling advance to produce a first scaled signal in each stage, separately accumulating the first scaled signals of each stage after each sampling advance, scaling and accumulating the accumulations of the first scaled signals of each stage after each M accumulations thereof to produce a weighting tap signal for each stage of the delay line, multiplying the received samples by the weighting tap signal of each stage to produce a weighted sampling for each stage, summing the weighted samplings to produce a summed signal, quantizing the summed signal to a selected quantum value which is selected in accordance with the relative value of the summed signal to the ideal quantum value, and determining and scaling the difference between the summed signal and the quantum value to produce the scaled error signal.

7 Claims, 4 Drawing Figures

AUTOMATICALLY ADAPTIVE TRANSVERSAL FILTER

The U.S. Government has rights in this invention pursuant to Contract No. MDA904-77-C-0432 awarded by the Department of the Army.

This invention relates generally to an automatic distortion correction circuit for efficient pulse transmission and more particularly to an improved automatically adaptive transversal filter for efficient pulse transmission.

The amplitude and delay distortions imposed on the flow of information in transmission channels, such as telephone lines or radio links, have been well known for sometime. Several circuits have been developed for reducing such distortion through the insertion of compensating linear devices. In the past, this reduction has been achieved primarily through the use of conventional lump parameter networks, which are passive by nature. More recently, however, the transversal filter has provided a more dynamic and flexible approach. The transversal filter is well suited to automatic and even adaptive operation and thus can meet the requirements of a channel with time-varying distortion.

It is inherent in nature that signals are dispersed, i.e., spread out and changed in the transmission thereof. This dispersion manifests itself generally in two ways, in radio communications it is called multipath, and in wire communication it is called linear distortion (dispersion). In the multi-path situation, the transit time from the transmitter to the receiver varies with the path so that two signals displaced from each other in time are received although only one was transmitted. Multipath transmission can also be viewed as communication through a group of parallel, distortion free channels of different lengths. This situation creates difficulties when an effort is made to maximize the information transmission rate in a channel.

Another type of communication, typified by a wire communication channel such as a telephone line, might have a single obvious transmission path (a wire) but not an ideal transmission frequency characteristic, i.e., one having a flat amplitude-frequency response and a linear phase-frequency response. When a transmission channel is band limited, which all channels are, its amplitude and phase frequency response functions can be expressed in terms of a Fourier series over the frequency band of interest. A convenient relationship between the time and frequency domains can then be given by paired-echo theory domains as set forth in an article by H. R. Wheeler appearing in Vol. 27, pp. 359-385 of the June, 1939 issue of the Proceedings of the IRE and entitled "The Interpretation of Amplitude and Phase Distortion in Terms of Paired Echoes" and incorporated herein by reference.

In all types of transmission paths, however, there is some phase-frequency with time distortion and some amplitude with frequency distortion although the phase-frequency distortion is more pronounced in multi-path transmission while amplitude distortion is more pronounced in single wire transmission. The components of the received signal (those resulting from the several mathematical terms required to describe both amplitude and phase distortions) can be added together to produce the total impulse response of the transmission paths. Such a superposition of pulses requires many terms to describe the channel distortion and so the impulse response of any given channel would consist of many overlapping, pulse waveshapes. The point of the above is to illustrate that the problems resulting from multi-path distortion and linear distortion are essentially equivalent. A device capable of correcting the effects of one form of distortion should, in theory, be capable of correcting the effects of the other form. An example of such a device is an adaptive transversal equalizer, an improvement of which is the subject of the present invention.

A transversal equalizer can take the form of a device comprising a tapped delay line into which the distorted signal is entered and is picked off at various taps on the delay line, delayed in time but unchanged in waveshape. The signal from each tap is passed through an associated variable attenuator and all of the attenuator output signals are then summed. The summed output is compared with a time-synchronized transmitted ideal waveform with the difference therebetween being the error signal. Such error signal is usually given a weighting before it is applied to the control circuit which, in effect, is the associated variable attenuator, and which functions in manner to minimize the weighted error signal. The technique by which the attenuators or control circuits are adjusted is as follows. The error signal is viewed as including a linear sum of the weighted signals appearing at the various taps. The transversal equalizer strives to minimize the systematic contribution to the error signal by the signals appearing at the various taps of the tapped delay line. Under a mean square-error (MSE) criterion, the measure of such a systematic contribution is cross-correlation. The control circuitry determines the polarity and magnitude of the cross-correlation between the various tap signals and the error signal and uses this information to change the value of tap weight values stored in tap weight registers in the attenuators by the magnitude increment thereof in the direction that makes the various cross-correlation values more nearly equal to zero. At the conclusion of the training period, the control circuit is disengaged from the output of the summing circuit and the equalized channel is then ready for use in a communication system.

For a discussion of the theory and operation of adaptive transversal equalizers reference is made to U.S. Pat. No. 3,992,616 to Acker, entitled "Receiver Equalizer Apparatus" and to an article entitled "Automation Equalization For Digital Communication" by Lucky and appearing on pages 547-588 of the April, 1965 issue of the Bell System Technical Journal, Vol. XLIV, both of which are incorporated herein by reference.

As a result of the attenuating circuits in the equalizer continuously minimizing the systematic contribution of the tap weight values to the error signal, the error signals and the values contained in the attenuators in the equalizer, except for the value in the center attenuator, become very small so that the number of stages in the tap weight registers, and a storage register also employed in the control circuit and required to record such small values, becomes very large and accordingly, very expensive. In fact, the number of stages in each of such registers can easily reach 20 stages. Since there can be many control circuits in a given equalizing delay line the total number of stages can become very large with a concomitant increase in expense.

The control circuits of adaptive equalizers also employ scaling functions which involve multiplying the above-mentioned error signals by a scaling quantity in order to make the final tap weights converge rather than diverge since divergence would result in an inoperative structure. Since the storage registers and the multipliers do require a larger number of stages in order to obtain the desired accuracy it is often necessary, in prior art structures, to employ a data processor which has the same bit capacity as there are stages in the equalizer registers. This implies that a data processor having a 16 word capacity would be required to operate a prior art adaptive equalizer which needed 16 bit accuracy.

The present invention enables the use of fewer stage registers and multipliers which then permits the use of a much less expensive fewer bit data processor (due to the smaller word capacity requirement) to obtain the same precision of operation of the equalizer as can be obtained with, for example, a prior art 16 bit system. Generally, such advantages are obtained by the present invention with the use of two control circuits arranged in serial manner such that one accumulates for a given number of samples and then scales and supplies such accumulation to the second accumulator. The use of two control circuits allows the scaling factor to be separated into two scaling functions thereby sharply reducing the number of stages required in the multipliers, the summers, and the storage registers.

In accordance with the present invention, there is provided a method (and structure) for the adaptive equalizing of phase and amplitude distortion of a received signal comprising the steps of digitally sampling the received signal, advancing each digital sample through successive stages of an N stage digital delay line, producing a constantly up-dated error signal in response to the sum of the weighted contents of all of the N stages of a delay line after each advance of the digital sample in the delay line, multiplying the digital samples in each stage of the delay line by such error signal for each sample advance to produce a first scaled signal, accumulating the first scaled signals after each sample advance, scaling down the accumulated first scaled signals, accumulating the scaled down accumulations of the first scaled signals after each M accumulations of such first scaled signals to produce a tap weight signal, and zeroing the values in the first accumulators, multiplying the samples by the tap weight signals to produce weighted samples, summing all of the weighted samples to produce a summed signal, quantizing the summed signal to a quantum value which is selected in accordance with the value of the summed signal, and determining and scaling the difference between the summed signal and the quantum value to produce the error signal.

Figure 4:
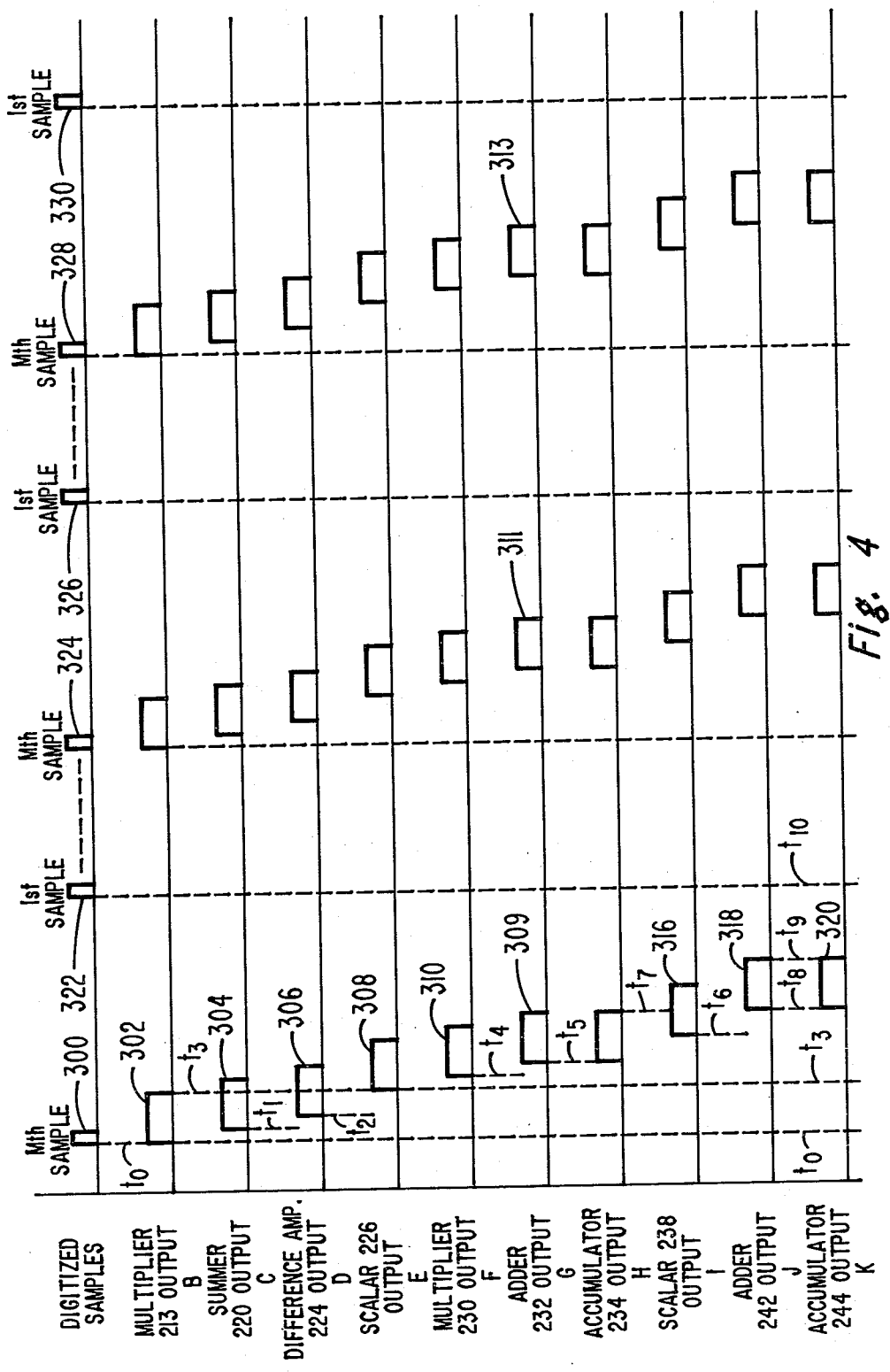

FIG. 4 if a set of timing waveforms to facilitate an understanding of the invention.

Figure 1:
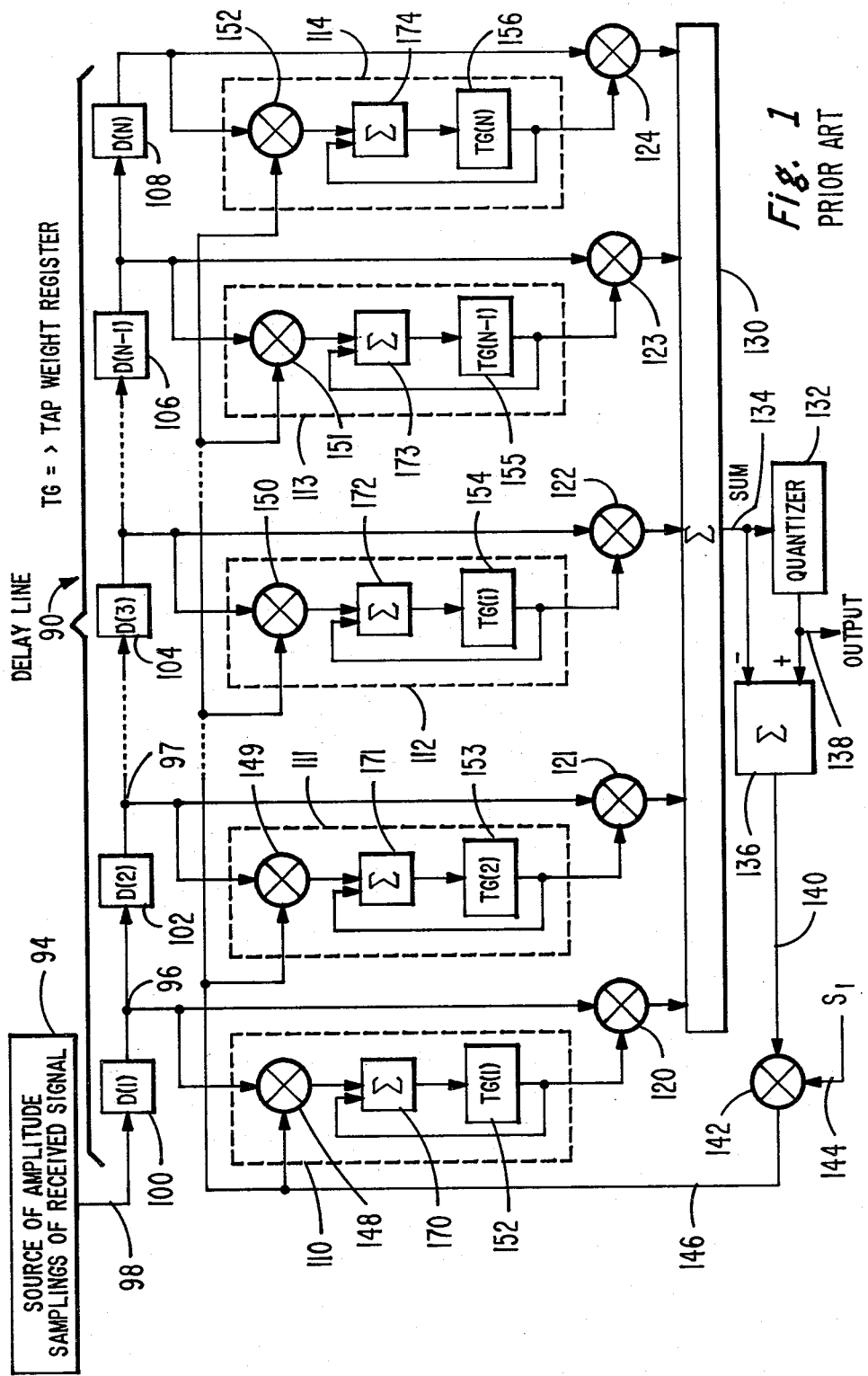
FIG. 1 shows a prior art MSE adaptive equalizer.

Referring now to FIG. 1, amplitude sampling means 94 supplies amplitude samplings of the received signal to a delay means 90 consisting of stages 100, 102, 104, 106 and 108 which can be charge coupled devices (CCD's) and representing delay times D(1), D(2)–D(N). The samples of the input signal are entered into the first stage 100 of the delay line and subsequently are advanced to subsequent stages of the delay line so that ultimately successively received samples will be present in all of the stages of the delay line. The number of stages in the delay line is determined by the amount of amplitude and delay distortion in the channel bandwidth desired to be processed by the delay line, and in general the spacing of the taps for synchronous data systems is equal to the reciprocal of the symbol rate. Reference is made to a paper entitled "Certain Topics In Telegraphic Transmission Theory" by Nyquist, appearing in Transactions of the AIEEE A7, pages 617–644 (1928), and incorporated herein by reference.

The output of each tap on the delay line, such as taps 96 and 97, is supplied to an associated correlation circuit, such as correlation circuits 110–114, and also to one input of a multiplier such as multipliers 120–124. The outputs of the correlation circuits 110–114 are supplied to the other inputs of multipliers 120–124, respectively. The outputs of the multipliers 120–124, in turn, are supplied to a common summer 130 whose output is then supplied to quantizing circuit 132 and also to one input of a differential summer 136. To the other input of differential summer 136 is supplied the output of quantizer 132. Differential summer 136 calculates the difference between the output of summer 130 and quantizer 132 to generate an error signal on its output lead 140. Such error signal is supplied to one input of multiplier 142. A scaling signal $S_1$ is supplied to the other input 144 of multiplier 142 to produce on output lead 146 thereof a scaled error signal. The scaled error signal on lead 146 is supplied in parallel to all of the multipliers 148–152 of the correlation circuits 110–114, respectively.

Each of the five correlation circuits 110–114 are identical in structure and operate in the same manner. Consequently, only one of them (correlation circuit 110) will be discussed in detail below.

Correlation circuit 110 consists of a multiplier 148, a summer 170, and an accumulator or tap register 152 which accumulates the tap weight value for the samples appearing at the output 96 of stage 100 of the delay line. As discussed above, multiplier 148, summer 170, and accumulator register 152 form a correlation circuit which functions to generate a tap weight value in register 152 which is used to multiply the output of delay stage 100. More specifically, each time a new sample is entered into stage 100 of the delay line, such sample is multiplied by the scaled error signal which was generated at the output of multiplier 142 on lead 146 after the last sample was entered into delay stage 100. The product of the multiplication of the new sample in stage 100 and the scaled error signal on lead 146 is supplied to summer 170 which adds such product to the then existing accumulation in register 152 to form a new sum which is supplied to the accumulating register 152 and thus, in effect, up-dates the tap weight value in register 152.

For a more detailed description of the operation of structures such as multiplier 148, summer 170 and tap weight register 152 reference is made to U.S. Pat. No. 3,633,105 issued to Lender et al, entitled "Digital Adaptive Equalizer System" and incorporated herein by reference.

The operations of the correlation circuits follow those performed in the generation of the error signal, that is, before the next sample (after the present new sample) is entered into stage 100 of the delay line, the new sum in register 152 is multiplied in multiplier 120 by the present new sample in stage 100 to produce a product which is supplied to summer 130 and which is used to generate the scaled error used by the correlators.

The correlation logic 111, 112, 113 and 114 cooperate in a similar manner with the output of the delay stages 102, 104, 106 and 108 and multipliers 121-124 to produce outputs which are supplied from multipliers 121-124 to common summer 130. Thus, the sum of the outputs of all the multipliers 120-124 is supplied, after each sample has been entered into the delay line, to quantizer 132 and also to the negative input of differential summer 136.

In a decision directed mode of equalization, it is the function of quantizer 132 to look at each summed output from summer 130, and generate an ideal transmitted waveform which will be assumed to be somewhere in between 0 and +1 and never outside these limits. The sum will never be greater than 1 or less than 0 because it is arbitrarily assumed herein that the transmitted signal was either a 1 or a 0 represented respectively by one volt or 0 volts. If the sum is more than 0.5 volts, for any sample, then the logic assumes that the tap weights at that time are such that the received signal more nearly represents the reception of a 1 than a 0 after the samples in each delay line stage are modified by the tap weights in multipliers 120-142. Therefore, the quantizing circuit 132 outputs a 1 to quantize the received response in a positive direction, since, as mentioned above, the sum is $\geq 0.5$ and the response is perceived by the logic to be approaching the reception of a 1. If the sum output from summer 130 is less than 0.5 volt then quantizer 132 interprets such sum to indicate that the signal being received should at that time, be at zero level. Accordingly, quantizer 132 outputs a 0 to differential summer 136 which takes the difference between the actual sum received and the 0 output of the quantizer and supplies such difference to multiplier 142 as the error signal. It can be seen that if the sum value is 0.9 volts for example, then the quantized value (the output from quantizer 132) will be 1 volt and the difference will therefore be +0.1 volt which is the error signal supplied to lead 140. Such +0.1 volt error signal will tend to increase the tap weight values in registers 152-156, respectively, to boost the system's response further towards a 1 value. On the other hand, if the summed value is 0.1 volt, then the output of the quantizing circuit 132 is 0 volts and the error signal on lead 140 becomes a −0.1 volt which tends to decrease the tap weight values in registers 152-156 accordingly, i.e. interpreting the received signal at that time as being a 0 level.

The foregoing may also be expressed in the following manner. The error signal supplied from difference summer 136 is viewed as including a linear sum of the weighted signals appearing at the various taps. As mentioned above, the total equalizer circuit strives to minimize the systematic contributions of these signals to the error signal. Under a means-square-error criterion, the measure of such a systematic contribution is cross-correlation. The polarity and magnitude of the cross-correlation between the various tap signals and the error signal is determined by the control logic 110 and uses this information to modify the values of the tap weight registers 152-156 by said magnitude in a direction that alters the various cross-correlation values towards some final values. At the end of the correction period the control logic is disconnected and the channel is ready for communication purposes. The output of the system appears on output terminal 138 and ideally is a faithful reproduction of the originally generated waveform.

The above discussion is tutorial in nature and applies to real equalizers only. Complex equalizers for phase systems can similarly be described.

Figure 2:
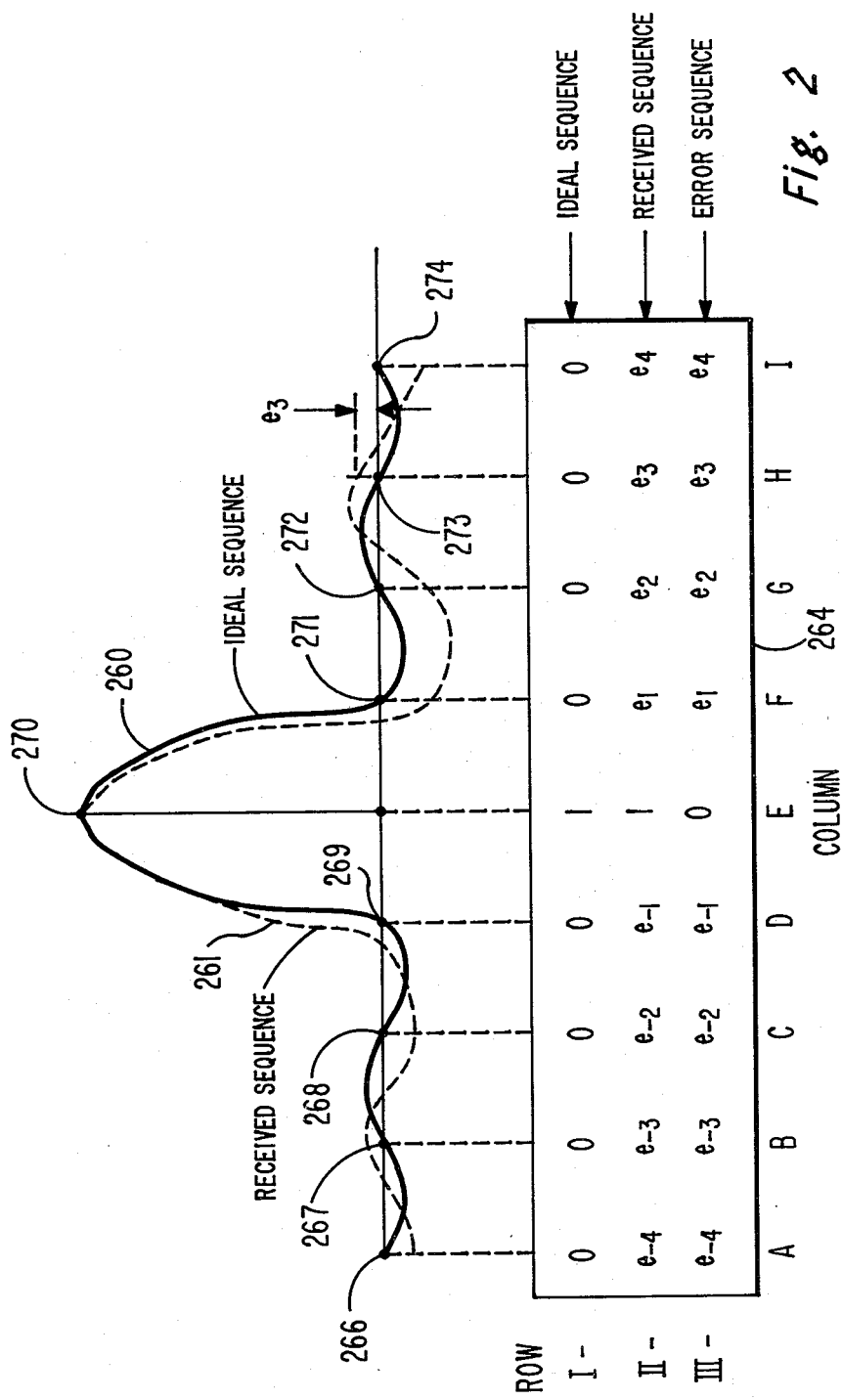
FIG. 2 is a waveform and a chart employed in a general description of the operation of the MSE adaptive equalizer shown in FIG. 1.

The operation of the prior art equalizer of FIG. 1 on a single pulse is shown in FIG. 2 wherein the received sequence is shown as the dotted line curve 261 and the ideal sequence is shown as the solid line curve 260. In the chart below the waveform of FIG. 2 it can be seen that the top row I shows the values of the received ideal sequence. Such ideal values are represented as 000010000 which correspond to the nine points 266-274 on the X axis of the waveform of FIG. 2. However, the actual sequence received is shown in row II of the chart of FIG. 2 and can be seen to have the values $e^{-4}$, $e^{-3}$, $e^{-2}$ and $e^{-1}$ corresponding to the points 266, 267, 268 and 269 on the X axis of FIG. 2. The received sequence also has a value 1 corresponding to the point 270 on the waveform of FIG. 2. The four points 271, 272, 273 and 274 on the X axis of the waveform of FIG. 2 have values $e^1$, $e^2$, $e^3$, and $e^4$ for the actual received sequence. The equalizer of FIG. 1 will generate an error sequence as shown in row III of chart 264 which is equal to the received sequence of values in row II except that the center value of the error sequence, i.e., the value in vertical column E of row III, is a 0 rather than a 1 as occurs in the received sequence. The reasons for the foregoing is that there is no error in column E in the received sequence at the time corresponding to the vertical column E. Consequently, there is no error signal generated in row III of column E. The error sequence will change and be minimized as the correlators up-date the tap weights as previously described.

The adaptive equalizer of FIG. 1 also functions to equalize the reception of asynchronous data pulses in a manner generally similar to that discussed above relative to the reception of the single pulse of FIG. 2. To accomplish the foregoing the equalizer, in effect, makes an estimate of the channel's impulse response from the data actually received. As the equalization proceeds and the inter-symbol interference is reduced, the estimate becomes increasingly better. Operation of the structure of FIG. 1 (and also FIG. 3) in the adaptive mode has the distinct following advantage. SHould the characteristic of the channel change as a function of time, the equalizer will also change to compensate therefor. A pre-set equalizer is blind to such a change.

It is to be understood that the processing of data in the adaptive equalizer of both FIGS. 1 and 3 usually will be in conjunction with a microprocessor of some type in a manner which will be described later herein.

Because of the very small values which accrue in tap weight registers 152-156, and the small scaled error signals which are generated and appear on lead 146, both of which are multiplied by the samples from the delay line in multipliers 148-152 and multipliers 120-124, the multipliers 148-152 and 120-124 require a large number of stages to accurately resolve such small signals.

These small numbers, i.e., numbers extending many places to the right of the decimal point, occur as a result of repeated multiplication and addition of complex fractional values.

Further, because of such small numbers, the stages in summers 170-174 and in the tap weight registers 152-156 must be correspondingly large to provide an accurate measure of the summed and accumulated values. Specifically, the multipliers and registers mentioned above must have a large number of stages to handle the data generated in the system without losing a significant portion of it due to overflow or underflow. For example, as succeeding scaled error signals are generated on output lead 146 they become increasingly more complex fractions and while the absolute value may vary, becoming either larger or smaller or even positive or negative, the number of stages required to accurately portray the true value of the fraction becomes increasingly larger so that ultimately some of the lower order bits are lost. These losses can occur in the multiplier 148, the summer 170, the tap weight register 152, the multiplier 120, or the summer 130. Such losses also occur in each of the correlation logic circuits 111, 112, 113 and 114 in a similar manner. The primary reason why the numbers involved in the prior art structure of FIG. 1 become so large in length, although not necessarily in absolute value, is because of the single stage of scaling employed which is effected by multiplier 142 to which a scaling value is applied via input lead 144.

It is because of this single scaling and the consequent large number of stages required to handle the lengthy resulting values that the use of an 8 bit processor, for example, in the system would require complex double precision techniques. The 8-bit bytes used in double precision values are required in order to prevent the loss of too much information.

Figure 3:
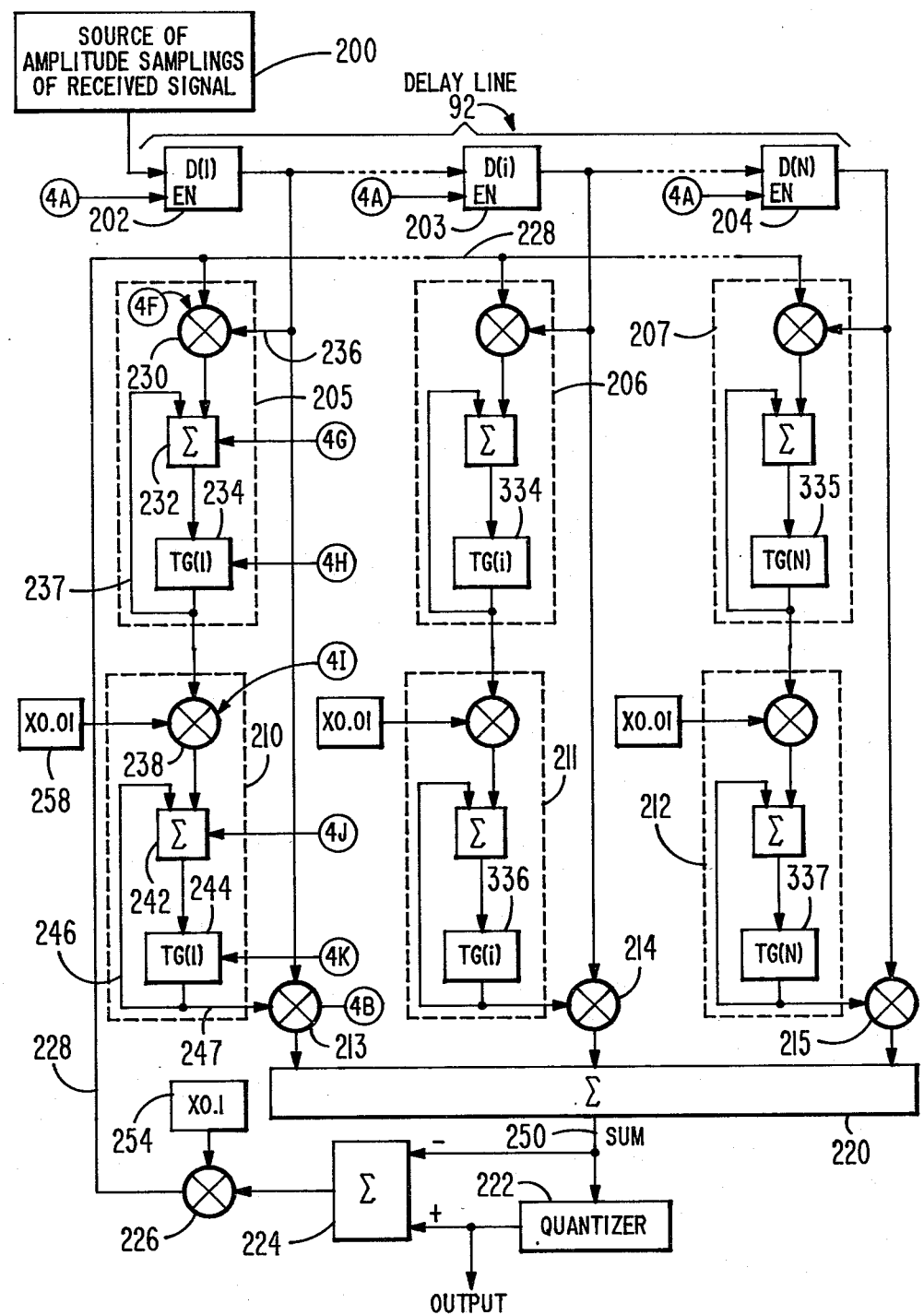
FIG. 3 is a block diagram of the present invention.

As indicated above, the logic of FIGS. 1 and 3, although represented as discrete logic, can be implemented with a data processor and appropriate programming. Thus, the registers 152–156 of FIG. 1, and the registers such as register 234 and register 244 of FIG. 3 can be selected memory locations in the processor memory. The arithmetic and computing functions within the control circuits 110, 111, 112, 113, and 114 of FIG. 1 and control logic 205, 206, 207, 210, 211 and 212 of FIG. 3 can all be accomplished by a single arithmetic logic unit (ALU) of a data processor employing multiplexing techniques with the results of each such computation being stored in appropriate memory locations which represent the various registers mentioned above.

Similarly, the functions performed by quantizer 222, summer 224, and scaling means 254 and 258 of FIG. 3 for example, can be performed by an ALU and appropriate programming in the microprocessor. In a commercial form of this invention, it could advantageously be implemented by means of a microprocessor, as discussed above. Because of the improved form of the adaptive transversal equalizer of the present invention, however, an 8-bit microprocessor, for example, can be employed to produce substantially the same degree of accuracy as could be obtained with a 16-bit microprocessor using a prior art form of the adaptive transversal equalizer and without the use of double precision techniques.

With the prior art system of FIG. 1, the use of double precision words can best be effected by employing a 16-bit word microprocessor which represents a substantially increased cost in a system whose requirements might otherwise be met with an 8-bit word microprocessor.

Referring now to FIG. 3, there is shown a preferred form of the invention which will obtain substantially the same accuracy with an 8-bit data processor, (for example) as will the structure of FIG. 1 obtain with a 16-bit data processor.

The principal difference between the prior art structure of FIG. 1 and the structure shown in FIG. 3 is that in FIG. 3 there are two correlation circuits which operate in a serial manner for each delay line stage. For example, correlation circuits 205 and 210 of FIG. 3 replace the single correlation logic stage 110 of FIG. 1. Because there are two correlation stages 205 and 210 in FIG. 3, the scaling function can be divided into two separate stages. Specifically, the scaling multiplier 226 and the scaling multiplier 238 of FIG. 3 together perform a scaling function which is equal to the single scaling function of multiplier 142 of FIG. 1. Thus, if the scaling value supplied to multiplier 142 of FIG. 1 is equal to 0.001 then the equivalent scaling function of FIG. 3 can be obtained by providing a scaling factor of 0.1 by multiplier 226 and a scaling factor of 0.01 by multiplier 238 of FIG. 3. The product of these two scaling functions is equal to 0.001.

Since the scaling value produce by multiplier 126 is 0.1 rather than 0.001 the values accumulated in tap weight register 234 of correlation logic 235 will not become as small as would be the case if the scaling value were 0.001 nor will they become too large since they are zeroed after each M samplings. Consequently, the number of stages required to store the accumulated value in tap weight register 234 to a given degree of accuracy is considerably less than would be required if the scaling factor were 0.001. It is apparent, as discussed above, that the smaller the number the larger will be the number of stages required to store such number to a given degree of precision. The larger the length of tap weight register 234 the fewer lower order bits will be dropped off and lost. Such losses are cumulative with each accumulation in the tap register 234.

Timing means are provided to dump the contents of tap weight register 234 into correlation logic 210 at every Mth accumulation (a block of samplings) in tap weight register 234, where M can be any desired number, such as 1024 for example. While the accumulation in tap weight register 234 will suffer some underflow, i.e., loss of some small values, it is much more accurate than would have been the case if the scaling factor were 0.001. Thus, the values supplied to correlation logic 210 represent a more accurate final value.

As each value is supplied to correlation logic 210, it is scaled down further by a scaling factor of 0.01. This scaled down quantity is supplied to the accumulator consisting of summer 242 and tap weight register 244 and is accumulated in tap register 244 in the manner described above.

Because the accumulation supplied from tap register 234 to multiplier 238 represents an accumulation of 1024 samples and because each of the accumulations individually is more accurate than would be provided with a higher scaling value, the positive and negative changes in each of the bit positions of tap register 234, over the 1024 accumulations, are accumulated with a high degree of accuracy, that is to say, the resultant total of 1024 up-datings are much more accurate than obtainable with the individual, larger scaling accumulations as done in the prior art.

Thus, while the values supplied to multiplier 238 from tap weight register 234 are scaled by a scaling factor of 0.01, such scaling is done on the accumulation of 1024 samples having a relatively high degree of accuracy so that the underflow, or loss of low order bits, in the values accumulated in tap weight register 244 is substantially less than would have been obtained with a single scaling factor of 0.001 as employed in the prior art structure of FIG. 1.

As discussed above, while element 244 is up-dated at the end of every block (1024 samplings) of data received the accumulation in tap weight register 244 is multiplied by each sample in the block of 1024 samplings in multiplier 213 and is supplied to summer 220. Similar multiplication products are supplied to summer 220 from multipliers 214 and 215. In the manner described with respect to FIG. 1, the output of summer 220 is supplied to quantizer 222 and also to difference summer 224. The quantizer 222 outputs a 0 or a 1 depending upon the value appearing on the output lead 250 of summer 220. Such quantized value is supplied to the positive input terminal of difference summer 224 which responds to the two signals supplied thereto to supply an error signal to multiplier 226.

Also as discussed above, a scaling factor 0.1 is supplied to multiplier 226 from scaling signal source 254 to produce a scaled error signal on lead 228 which is supplied to one input of multiplier 230. Multiplier 230 corresponds to multiplier 148 of FIG. 1. The output of delay stage 202 is supplied to the other input of multiplier 230 via lead 236 and the product thereof is supplied to one input of summer 232. The summer 232 and the tap weight register 234 function together to provide an accumulation in the tap weight register 234 in the manner discussed in connection with FIG. 1 except that they are zeroed after each M-sampling block of input samples.

A specific timing relationship for the various adders, multipliers, and summers of the logic block diagram of FIG. 3 is shown in the waveforms of FIG. 4. For purposes of brevity the eleven waveforms labelled waveforms A through K will be identified herein as waveform 4A, waveform 4B, etc., rather than as waveform A of FIG. 4.

The various timing waveforms of FIG. 4 are indicated in FIG. 3 by encircled legends such as 4A, 4B, etc. with lead lines to the logic elements whose timing is being controlled. Thus, the encircled legend 4G and the associated lead line pointing to summer 232 means that summer 232 is enabled driving pulses 309, 311 and 313 of waveform 4G to add the output of multiplier 230 to the contents of accumulator register 234.

Waveform 4A shows the samplings appearing at the output of the delay stage 202 of FIG. 3. It is to be understood that previously received samples will occupy delay stages 203 and 204 and will have timing waveforms similar to those employed in the control logic 205 and 210 associated with stage 202.

The first sample 300 in waveform 4A is arbitrarily designated as being the Mth sample of a series of samples received. Sample 322 represents the first sampling after the Mth sample 300 and Mth sample 324 represents the Mth sample after the first sample 322. The samples from a given first sample such as sample 322 to an Mth sample 324 represent a complete block of M samples which, as discussed above, can be 1024 samples per block. The cycle of samplings is iteratively repeated as long as the message is being received. Thus, the first and Mth samplings 326 and 328 represent a third block of M samples and the first sample 330 represents the beginning of yet another block of M samples.

As the Mth sample 300 is received at time $t_0$ the multiplier 213 will be enabled to multiply such sample 300 by the contents of tap weight register 244 to produce a digital output for a time duration represented by the time waveform 302 of waveform 4B. The digital summer 220 will be energized beginning at time $t_1$ for a time period 304, as shown in waveform 4C, to produce a digital output which is the sum of the outputs of all of the multipliers 213, 214, and 215, and which is supplied to both the quantizer 222 and the differential summer 224 which is energized for a time period 306 shown in waveform 4B.

Scaler multiplier 226 is enabled during time period 308 as shown in waveform 4D to scale the signal supplied from amplifier 224. Next, multiplier 230 is enabled during time period 310, as shown in waveform 4F, to multiply the Mth sample 300 by the output of scalar multiplier 226. During time period $t_5$–$t_7$ the adder 232 and the accumulator 234 are both enabled, as shown in waveform 4G and 4H, to add the output of multiplier 230 to the accumulated contents of register 234. Accumulator 234 is zeroed after each block of M samples.

During time period 316 of waveform 4I the scalar multiplier 238 is enabled to multiply the output of accumulator 234 by the scaling factor 0.01 as shown in block 258. Finally, during time period $t_8$–$t_9$, adder 242 and register 244 are enabled to add the output of scalar multiplier 238 to the accumulated contents of tap weight register 244 and to store the new total back into tap weight register 244. The complete processing of the data after the Mth sample 300 is completed at time $t_9$, well before the occurrence of the next received first sampling pulse 322 at time $t_{10}$.

What is claimed is:

1. A method for adaptively equalizing distortion in a received signal by an N-stage delay line system and comprising the steps of:
    sampling said received signal and advancing each sample through successive stages of said N-stage delay line;
    producing a continuously up-dated scaled error signal after each advance of the samples in said delay line;
    scaling the sample in each delay line stage by said scaled error signal after each sample advance to produce a first scaled signal for each stage;
    separately accumulating the first scaled signals for each stage after each sampling advance;
    scaling and accumulating the accumulations of said first scaled signals for each stage after each M accumulations thereof to produce a first weighting signal for each stage of said delay line;
    multiplying the samples and the weighting signals for each stage together to produce a weighted sample for each stage;
    summing all of said weighted samples from all of said stages to produce a summed signal;
    quantizing said summed signal to selected quantum values; and
    determining and scaling the difference between said summed signal and said quantum value to produce said scaled error signal.

2. A method for adaptively equalizing distortion in a received signal comprising the steps of:
    digitally sampling said received signal;
    supplying and advancing each digital sample through successive stages of an N-stage delay line;
    producing an up-dated error signal in response to the sum of the contents of all of the N-stages of said delay line after each advance of the samples in said delay line;
    multiplying the sample in each stage of said delay line by said up-dated error signal after each sample advance to produce a first scaled signal for each stage of said delay line;

accumulating said first scaled signals of each stage of said delay line after each sample advance;

scaling down each accumulation of said first scaled signals;

accumulating the scaled down accumulations of said first scaled signals of each stage afer each M accumulations of said first scaled signals to produce a weighting signal;

multiplying the samplings of each stage by said weighting signals to produce a weighted sample for each stage;

summing said weighted samples to produce a summed signal;

quantizing said summed signal to a quantum value which is selected in accordance with the value of said summed signal; and determining and scaling the difference between said summed signal and said quantum value to produce said error signal.

3. An adaptive equalizer for equalizing distortion in a received signal, said equalizer comprising:

N-stage delay line means;

first means for sampling said received signal into samples and for serially entering said samples into said delay line means;

first logic means responsive to the samples contained in each of said delay line stages to generate a scaled error signal;

said first logic means further comprising:

N second logic means each responsive to the sample in an associated one of said N delay line stages and to said scaled error signal to produce a weighted sample;

summing means for summing all of said weighted samples after each entry of a new sample into said delay line means;

decision making means responsive to each of the sums from said summing means to generate a selected quantized output signal;

second means for determining and scaling the difference between said first and quantized output signals to produce said error signal;

said second logic means further comprising:

first multiplier means for multiplying the sample in the associated delay line stage by said scaled error signal to produce a first scaled output signal;

accumulating means for accumulating the values of said first scaled output signals;

third means for scaling and accumulating the accumulated value of said first scaled output signals at every Mth sample to produce a weighting tap signal; and second multiplying means for multiplying said weighting tap signal by the value of the sample in the associated delay line stage to produce said weighted sample.

4. An adaptive equalizer as in claim 3, in which said first means is a means for sampling said received signal and for converting said samples into digital form and in which said delay line means is a digital delay line means.

5. In an adaptive equalizer for equalizing distortion in a received signal and comprising N-stage delay line means, and first means for sampling said received signal to provide samples and for serially entering said samples into said delay line means, and first logic means responsive to the samples contained in said delay line stages to generate a scaled error signal and comprising N second logic means each responsive to the sample in an associated one of said N delay line stages and to said scaled error signal to produce a weighted sample, said first logic means further comprising summing means for summing all of said weighted samples after each entry of a new sample into said delay line means, decision making means responsive to each of the sums from said summing means to output a selected quantized output signal, and second means for determining and scaling the difference between said first and quantized output signals to produce said scaled error signal, and in which said second logic means comprises:

first multiplier means for multiplying the sample in an associated delay line stage by said scaled error signal to produce a first scaled output signal;

accumulating means for accumulating the values of successive blocks of M first scaled output signals;

third means for scaling said accumulated first scaled output signals;

second accumulating means for accumulating said scaled accumulated first scaled output signals at every Mth sample to produce a weighting tap signal; and second multiplying means for multiplying said weighting tap signal by the value of the sample in the associated delay line stage to produce said weighted sample.

6. An adaptive equalizer as in claim 5 in which said first means is a means for sampling said received signal and for converting said samples into digital form and in which said delay line means is a digital delay line means.

7. An adaptive equalizer for equalizing phase and amplitude distortion of a received signal, said equalizer comprising:

N-stage digital delay line means;

means for sampling and digitizing said received signal into digitized samples and for serially entering said digitized samples into said digital delay line means;

first logic means responsive to the samples contained in each of said N delay line stages to generate a scaled error signal;

said first logic means comprising:

N second logic means each responsive to the sample in a corresponding one of said N delay line stages and to said scaled error signal to produce a weighted sample;

summing means for summing all of said weighted samples after each entry of a new sample into said delay line means;

decision making means responsive to each of the summings from said summing means to output a selected quantized output signal; and means for determining and scaling the difference between said summings and said quantized output signals to produce said scaled error signal;

each of said N second logic means further comprising:

first multiplier means for multiplying the sample in said corresponding delay line stage by said scaled error signal to produce a first scaled output signal;

first accumulating means for accumulating said first scaled output signals;

means for scaling the accumulated first scaled output signals every Mth sample;

second accumulating means for accumulating the accumulated scaled first scaled output signals at every Mth sample to produce a weighted tap signal; and second multiplying means for multiplying the contents of said second accumulating means by the value of the sample in the associated delay line stage to produce said weighted sample.

* * * * *